Patented June 18, 1946

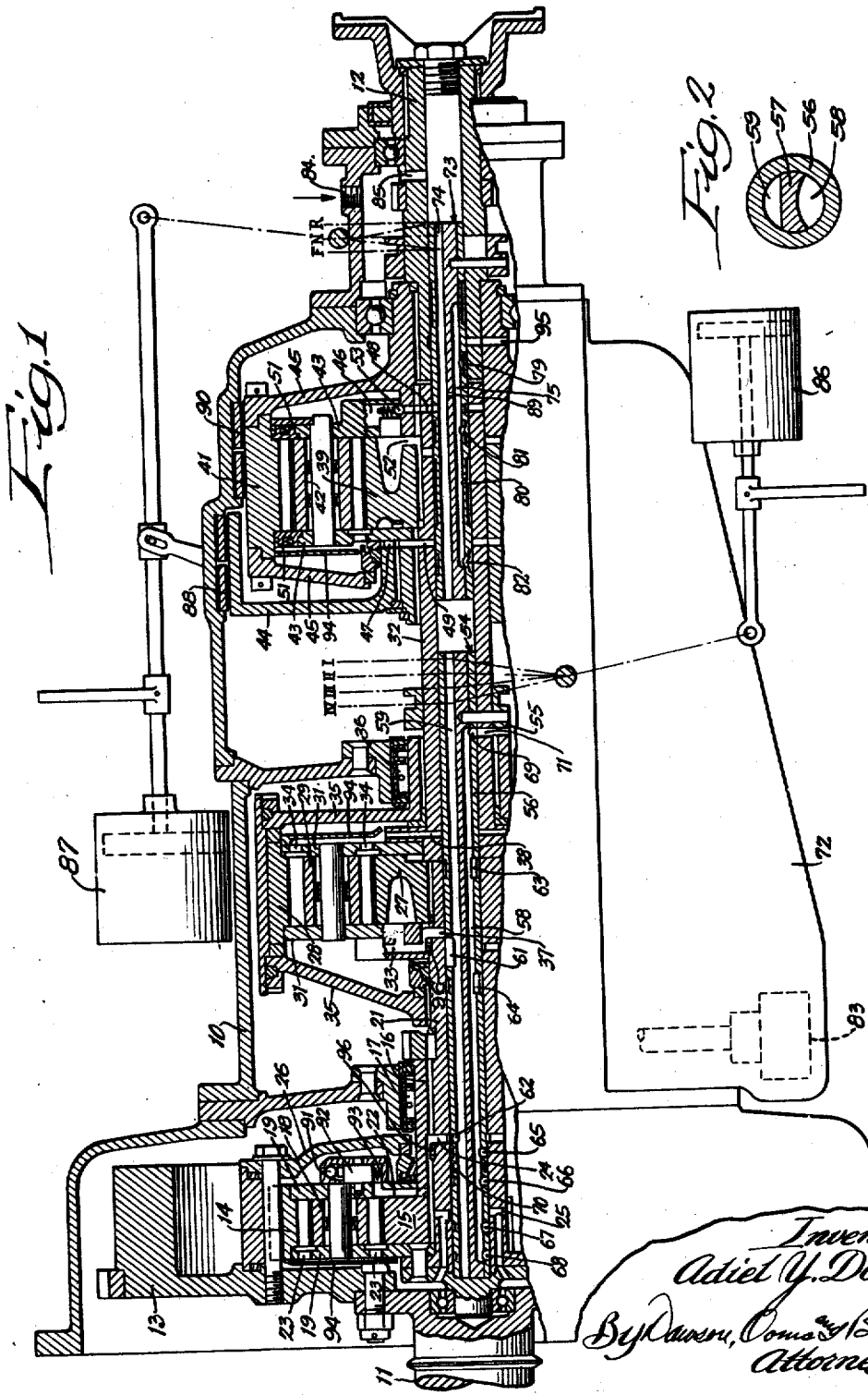

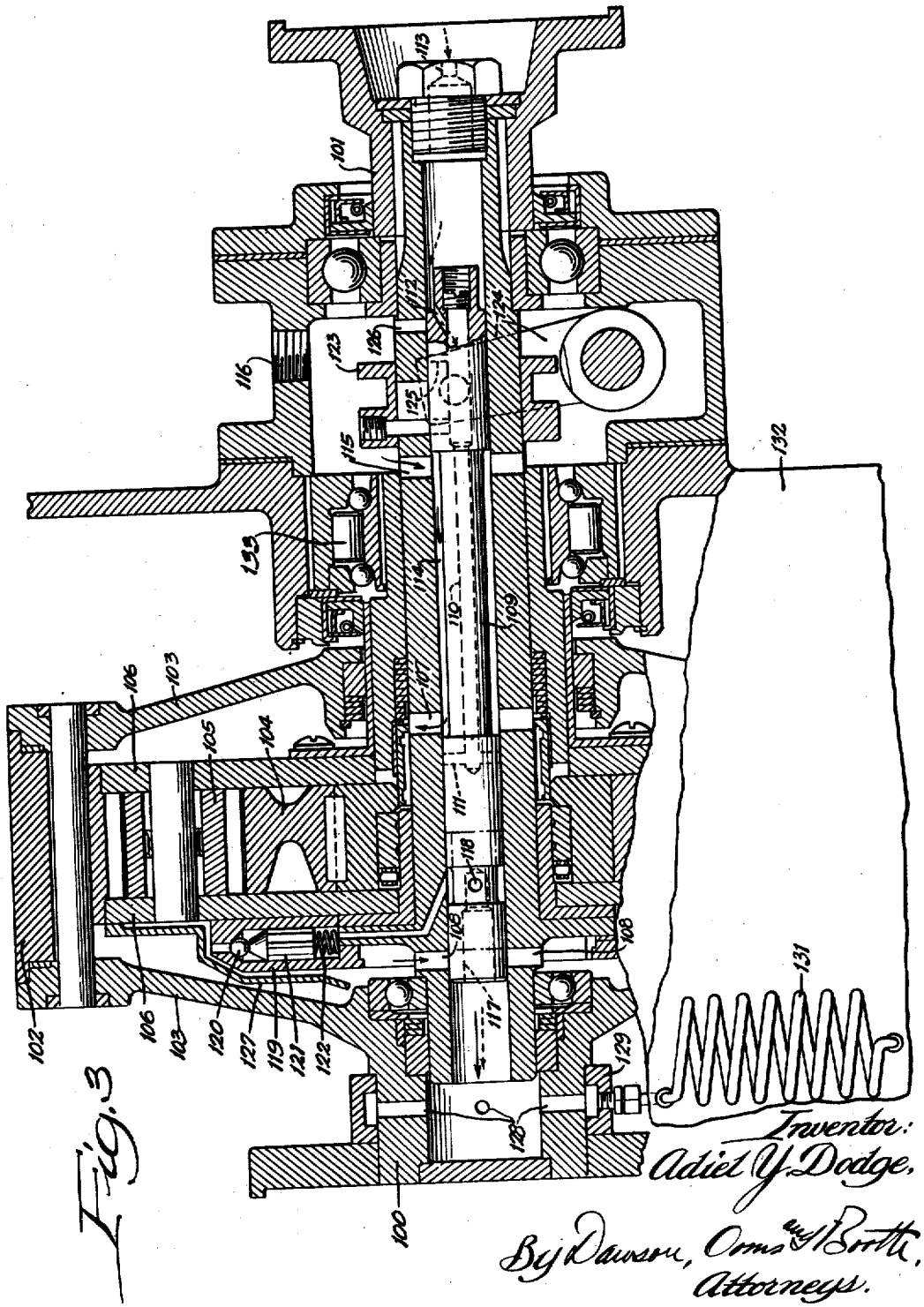

2,402,382

UNITED STATES PATENT OFFICE 2,402,382

TRANSMISSION

Adiel Y. Dodge, Rockford, Ill.

Application May 19, 1944, Serial No. 536,248

14 Claims. (Cl. 74—293)

This invention relates to transmissions and more particularly to fluid step type transmissions for selectively providing a plurality of torque and speed ratios.

One of the objects of the invention is to provide a transmission employing a plurality of fluid clutch units in which the drag in the clutch units is reduced to a minimum during idling. In one preferred construction the clutch units are formed by gear sets functioning as reduction gears during idling and as clutches when relative rotation of the gears is blocked.

Another object of the invention is to provide a transmission including a gear pump which may be filled with fluid to function as a clutch and through which gas is circulated during idling to minimize drag.

Still another object of the invention is to provide a transmission including a gear pump unit supplied with both liquid and gas in which baffles are provided to minimize mixing of the liquid and gas at the pump outlet.

A further object of the invention is to provide a transmission including a gear pump through which gas is circulated during idling and in which a relatively small amount of liquid is mixed with the gas for lubrication.

The above and other objects and advantages of the invention will be more readily apparent from the following description when read in connection with the accompanying drawings, in which—

Figure 1 is an axial section with parts in elevation of a transmission embodying the invention;

Figure 2 is a partial section of the valve; and

Figure 3 is a view similar to Figure 1 of an alternative construction.

The transmission of Figure 1 is housed in a stationary housing 10 which may replace the usual transmission casing in an automobile or the like. A driving shaft 11 which may be the crank shaft of an internal combustion engine or the like extends into the housing coaxially with a driven shaft 12 connected to the mechanism to be driven.

The driving shaft is connected to a fly wheel 13 carrying an annular ring gear 14 forming a part of a planetary differential gear set. The gear set includes a sun gear 15 connected to a sleeve 16 which is held against reverse rotation by a combined one-way brake and bearing unit 17. Planet pinions 18 mesh with the sun and ring gears and are carried by a gear carrier formed by spaced plates 19. The plates 19 are connected to a tubular driven shaft 21.

The gears of the gear set have the ends of their teeth fitting closely against the plates 19 and blocking means not shown, are provided between the plates engaging the ends of the teeth so that the gear set forms a fluid pump unit. Fluid is supplied to the unit through one or more inlet ports 22 and is discharged from the unit through outlet ports 23 in one of the plates 19. The inlet ports 22 communicate with ports 24 in the tubular shaft 21 and the outlet ports 23 open into the space around the side plates 19 which in turn is connected to outlet ports 25 in the shaft 21. The space around the side plates is enclosed by a cover plate 26 connected to the ring gear and sealing against the sleeve 16 to form a closed outlet chamber.

The shaft 21 which forms the driven shaft of the first gear unit is connected to the sun gear 27 of a second similar gear unit including a ring gear 28 and planet pinions 29. The planet pinions 29 are supported between plates 31 forming a gear carrier and which are connected to a second tubular shaft 32 coaxial with the driving and driven shafts. One of the plates 31 is formed with one or more inlet ports 33 and the other plate is formed with outlet ports 34 discharging to the space outside of the plates 31. The second gear unit is enclosed by side flanges 35 connected to the ring gear and sealing against the shafts 21 and 32 respectively. The ring gear is prevented from reverse rotation by a combined one-way brake and bearing unit 36 engaging an axial flange on one of the plates. The inlet ports 33 of the second gear unit communicate with inlet ports 37 in the shaft 21 and the outlet ports communicate with elongated outlet ports 38 formed in a flange on the shaft 32.

The shaft 32 carries the sun gear 39 of a third gear unit which is completed by a ring gear 41 and intermeshing planet pinions 42. The pinions 42 are carried between side plates 43 forming a gear carrier and which are connected to a brake drum 44. The third unit is enclosed by side plates 45 connected to the ring gear one of which is keyed or splined to the driven shaft 12.

The gears of the third unit are enclosed in the same manner as the first two units and the side plates are formed with inlet ports 46 and outlet ports 47 which communicate respectively with inlet ports 48 and outlet ports 49 in the shaft 32.

As shown, in connection with the third unit, the side plates may carry spring pressed sealing buttons 51 engageable with the ends of the teeth on the ring gear and planet pinions to form a yielding seal therebetween which will compensate for imperfect fit or for wear. These buttons are more particularly described and claimed in my copending application, Serial No. 522,222, filed February 14, 1944. A spring pressed check valve 53 prevents reverse flow thru the inlet port 48 so the unit will transmit torque in both directions when it is operating as a clutch. An auxiliary port 52 is provided to act as an outlet port during reverse drive as more fully described in my copending application, Serial No. 522,222.

The inlet and outlet ports for the first two units are controlled by an elongated slide valve 54 slidable in the hollow shaft 32 and moved through a collar 55 controlled manually or in any other desired manner by a yoke, not shown. The valve 54 is formed by a cylindrical tube 56 which may be of brass or like material having a diammetrical partition 57 therein dividing the valve into two separate passages 58 and 59. The partition 57 has enlargements at its ends on one side only closing the ends of the passage 58 while the passage 59 is open through the ends of the sleeve. The sleeve 56 is formed with port openings 61 and 62 communicating with the valve passage 59 and adapted to register with the inlet ports 24 and 37 when the valve is in the position shown. Similar ports 63, 64, 65, 66, 67 and 68 open through the sleeve 56 into the passage 58 and are adapted to register with the inlet and outlet ports in the first two gear units in another position of the valve as will be explained later. The passage 58 is adapted to be connected through an inlet port 69 with a port 71 in the shaft 32 which communicates with the upper portion of an oil sump 72 at the bottom part of the transmission housing.

The third gear set is controlled by a similar slide valve 73 formed of a cylindrical tube with a partition dividing it into two separated passages one of which shown at 74 extends completely through the valve while the other of which 75 is closed at its ends. A port in the sleeve communicates with the passage 74 and is adapted to register with the inlet port 48 when the valve is in the position shown. The sleeve is formed with a series of ports 79, 80, 81, and 82 communicating with the passage 75 and adapted to register with the inlet and outlet ports of the third gear unit in other positions of the valve.

Oil or other desired operating liquid is supplied to the valves by a pump 83 located in the sump 72 and connected to an opening 84 in the transmission housing which communicates thru an opening 85 with the interior of the tubular driven shaft 12. The oil is preferably supplied under pressure and flows thru the passage 74 of the second valve into the passage 59 of the first valve.

The valve 54 is controlled by a fluid motor 86 which may be controlled manually or automatically in response to speed and torque as more particularly described and claimed in my copending application, Serial No. 522,222. The valve 73 is controlled by a similar fluid motor 87 which simultaneously shifts the valve and operates a brake 88 engageable with the drum 44.

For neutral the valve 54 is shifted to the right to the position marked I and the valve 73 is shifted to the right to the position marked N. In this position the passage 58 of valve 54 is connected thru the port 69 and the port 71 which is in the form of an elongated slot to the upper part of the sump 72. The port 63 communicates with the discharge port 38 of the second gear set and the port 64 communicates with the inlet port 37 of this gear set. The port 66 is in communication with the inlet port 24 of the first gear set and the discharge port 25 of the first gear set is in communication with the port 68 of the valve. Thus the inlet and outlet ports of the first two gear sets are in open communication with the valve passage 58 so that air from the upper part of the sump is supplied to the inlet ports of the gear sets to be circulated therethru and to be discharged back into the passage 58 thru the gear set outlet ports. Any oil is the gear sets will be pumped into the passage 58 and will return to the sump. However, there will always be sufficient oil vapor in the air circulating thru the gear sets to provide adequate lubrication.

The valve 73 is moved to a position to connect the port 79 with an inlet port 95 communicating with the upper part of the sump to connect the valve passage 75 to the sump to receive air therefrom. The inlet port 48 of the third gear set is in communication with the port 81 and the outlet port 49 is in communication with the port 82 so that air will be circulated thru the gear set. If desired, for purpose of lubrication, small by-pass opening 89 may be provided in the valve partition to supply a minimum amount of oil to the air to insure lubrication of the gears.

In this position of the valves the gear sets all operate freely. The one-way clutches 17 and 36 of the first two gear sets hold one element of each against reverse rotation so that they operate as gear reduction units to multiply the torque of the driving shaft in two stages and to drive the sun gear 39 of the third gear set at reduced speed and increased torque. No torque is transmitted thru the third gear set, however, since the gear carrier is free to rotate so that this gear set idles and does not transmit any torque to the driven shaft. I have found that there is very little drag in the gear set when air is circulated therethrough as described so that the tendency of the driven shaft to creep is minimized. However, if desired, any tendency to creep can be positively eliminated by means of a brake 90 engageable with the ring gear 41 to hold the driven shaft stationary.

If reverse drive is desired the motor 87 may be operated to shift valve 73 to position R and engage the brake 88 with the drum 44 to hold the gear carrier stationary. At this time port 52 is connected to passage 75 thru ports 80 so the gears are free to turn and rotation of the sun gear will be reversed thru the planet pinions to drive the ring gear and driven shaft in a reverse direction at low speed and at maximum torque. For higher speed reverse drives if desired the valve 54 may be shifted to one of its intermediate or direct drive positions as described hereinafter in connection with higher speed forward drives, while retaining the valve 73 in position R with the brake 88 engaged. During reverse operation of the third gear unit the outlet port 49 becomes the inlet and air is pumped out of the unit thru the auxiliary port 52 and the port 80.

For low speed forward drive the valve 54 is retained in position I and valve 73 is shifted to the left to position F as shown. In this position the outlet port 49 is blocked and the inlet port 48 is in communication with the port 76. Thus, oil will be supplied to the inlet port to block the gears of the unit against relative rotation so that the unit functions as a clutch directly connecting the shaft 32 and the driven shaft 12. At this time the driven shaft will be turned at reduced speed and increased torque thru the first two gear sets which function as gear reduction units.

For higher speed forward the valve 54 is shifted to position II. In this position the inlet port 37 and outlet port 38 of the second gear set remain in communication with the ports 63 and 64 of the valve while the inlet port 62 of the first gear unit is connected to a port 70 communicating with the valve passage 59 and the exhaust port 25 of the first gear set is closed. The first gear set at this time functions as a clutch to transmit torque directly from the driving shaft to the shaft 21 while the second gear set continues to function as a gear reduction unit. Driving shaft torque is therefore transmitted through a single reduction to the driven shaft which will be turned at a lower speed and higher torque than the driving shaft.

For the next higher speed forward the valve 54 is moved to position III in which the exhaust port 38 of the second gear set is closed and the inlet port 37 is in communication with the port 61. The inlet port 24 of the first gear set is connected to the port 65 and the exhaust port 25 of the first gear set is connected to the port 67. In this position the first gear set can turn freely to function as a reduction gear while the second gear set is blocked to operate as a clutch connecting shafts 21 and 32. The first two gear sets are formed with different gear ratios so that in this position the driven shaft will be driven at a higher speed and lower torque relative to the driving shaft.

For direct drive the valve 54 is moved to position IV as shown, to close both outlet ports 25 and 38 and open both inlet ports 24 and 37 to the valve passage 59 thru the ports 62 and 61 respectively. In this position all three of the gear units function as clutches to cononect the driving shaft 11 directly to the driven shaft 12.

Overrunning during forward operation is prevented by the check valve 53 in the third unit and by check valves in the form of rings 96 in the first two units. When fluid is entering the inlet ports the rings 96 are shifted by pressure of the fluid thereon to the position shown to open the ports. Upon a reversal of fluid flow the rings will shift in response to reversal of the fluid pressure to close the inlet ports, blocking the escape of fluid so the gears will be blocked to transmit torque in the reverse direction.

In order to provide greater slip in the gear units when shifting at low speed, a direct bypass from the outlet to the inlet of each unit may be provided. As shown in connection with the first unit, the by-pass is provided by an outwardly seating ball valve 91 urged against its seat by a centrifugal weight 92 and a spring 93. Under normal operation the valve 91 is seated in response to the spring 93 and centrifugal force on the weight 92. However, if the discharge pressure builds up to a sufficient value as during shifting at relatively low speed the valve 91 will open to by-pass discharged fluid directly to the inlet. Thus this valve not only reduces shock during shifting but operates as a safety means to prevent the building up of dangerous pressures in the gear units.

During idling of the gear units a certain amount of oil in the form of vapor or small particles is carried thru the units by the air to assist in lubricating the units. To minimize mixing of this oil with the air to form objectionable foam, baffles 94 are provided in each of the gear units carried by one of the side plates of the gear carrier and overlying the discharge ports in the side plates. The baffles are connected at their periphery to the side plates and extend inwardly toward the discharge ports of the units. During operation any oil leaving the discharge ports in the side plates will be thrown outwardly in the baffles while the air will be directed inwardly toward the discharge ports in the respective shafts on which the units are mounted. In this way, churning of the oil with air is minimized and the oil is kept relatively air free.

In Figure 3 there is illustrated a single gear unit with a modified valve control which could be used alone or could replace one or more of the separate gear units of Figure 1. The gear unit of Figure 3 is adapted to connect an input or driving shaft 100 to a driven shaft 101. The driving shaft 100 is connected to a ring gear 102 thru side plates 103 which form a closure for the gear unit. The gear unit is completed by a sun gear 104 and planet pinions 105 meshing with the sun and ring gears. The planet pinions are carried between plates 106 which are formed with inlet and outlet ports and which carry blocking means for the ends of the gear teeth so that the gear unit forms a fluid pump. The side plates 106 are connected as shown to the driven shaft 101.

The unit is supplied with fluid thru inlet ports 107 which is discharged thru outlet ports 108 in the tubular driven shaft 101. The ports 107 and 108 are controlled by an elongated valve 109 slidable in the shaft 101 and formed at one end with a central bore 110 terminating in a transverse bore 111 intermediate the ends of the valve. The bore 110 is supplied with air or other gas through a port 112 communicating with the outer end of the driven shaft. The air or gas enters the outer end of the driven shaft thru an opening 113 and flows thru port 112 into the bore 110.

The outer surface of the valve is reduced as indicated at 114 between the bore 111 and port 112 to provide a passage in the driven shaft around the valve. This passage is adapted in one position of the valve to communicate with an inlet port 115 receiving oil or other operating liquid from a pump such as shown at 83 in Figure 1 thru an opening 116.

At its opposite end the valve is formed with a short bore 117 terminating in a transverse bore 118 spaced slightly from the end of the valve. When the valve is in its clutching position as shown, the bore 118 communicates with a valve casing 119 containing a ball valve 120 urged against its seat by a weight 121 and a spring 122. The valve 120 controls direct communication between the discharge chamber and the relief bores 118 and 117 to relieve excessive pressure in the discharge chamber, thus reducing shock during shifting and providing a safety relief, as described in connection with the valve 91 of Figure 1.

The valve may be shifted thru a collar 123 and yoke 124 to the position shown in which ports 115 and 107 both communicate with the passage 114 and the outlet port 108 is closed. In this position, oil supplied thru the opening 116 will enter the inlet port 107 of the gear unit to block the gears against relative rotation so that the gear unit operates as a clutch directly to connect the driving and driven shafts.

When the valve is shifted to the right the inlet port 107 will register with the bore 111 to supply air to the inlet of the unit and the discharge port 108 will be opened to the left end of the shaft 101. It will be understood that this end of the shaft may be connected to a sump or the like as desired. In this position air will be circulated freely thru the gear unit entering thru the right end of the shaft and discharging thru the left end of the shaft so that the unit can idle freely. Preferably, during this time the sun gear 104 is held against reverse rotation by a one-way brake 133 so that the unit operates as a gear reduction unit.

In order to provide lubrication for the gears during the idling position just described, a restricted port 125 may be provided in the valve to register with a port 126 communicating with the oil inlet opening 116. The port 125 will supply a minimum amount of oil to the air pumped thru the unit to insure adequate lubrication. Since the oil and air pumped thru the unit are not recirculated but are discharged separately from the inlet passages, any foam produced can be conducted back to the sump where the foam will be dissipated so that air free oil can always be supplied to the unit when it is to be operated as a clutch. Mixture of the air and oil is further reduced by providing a baffle 127 overlying the discharge ports of the unit and functioning similarly to the baffles 94 of Figure 1.

Oil vapor or the like carried by air discharged from the unit is preferably condensed by passing the discharge thru a cooling means before returning it to the sump. As shown, the shaft 100 is formed with ports 128 opening into a collector ring 129. A coil 131 is connected at one end to the collector ring and extends out thru the sump indicated at 132 so that the major portion of the coil is exposed to outside atmosphere. At its lower end the coil reenters the sump to discharge into it. Any oil vapor carried by the air discharged from the unit will condense in the coil 131 and will be returned to the sump in liquid form. Thus loss of oil is prevented and any foam or like particles carried by the air is removed by condensation before the oil is returned to the sump.

While two embodiments of the invention have been shown and described in detail herein, it will be understood that these are illustrative only and are not intended as definition of the scope of the invention, reference being had to the appended claims for this purpose.

What is claimed is:

1. In a transmission for connecting a driving member to a driven member, a planetary differential gear set, means for connecting two elements of the gear set to the driving and driven members respectively, means including the gears of the gear set whereby they form a fluid pump and providing inlet and outlet ports for the gear set, a valve having separated passages therein, means for connecting one of the passages to a source of liquid, means for connecting the other passage to a source of gas, and means for moving the valve to one position in which the outlet port is closed and the inlet port is in communication with said one of the passages or to a second position in which the outlet port is open and the inlet port is in communication with said other of the passages.

2. In a transmission for connecting a driving member to a driven member, a planetary differential gear set, means for connecting two elements of the gear set to the driving and driven members respectively, means inclosing the gears of the gear set whereby they form a fluid pump and providing inlet and outlet ports for the gear set, a valve having separated passages therein, means for connecting one of the passages to a source of liquid, means for connecting the other passage to a source of gas, and means for moving the valve to one position in which the outlet port is closed and the inlet port is in communication with said one of the passages or to a second position in which the outlet port is open and the inlet port is in communication with said other of the passages, the valve being formed with a restricted connection between the passages to supply a relatively small amount of liquid to the inlet port when the valve is in said other position.

3. In a transmission for connecting a driving member to a driven member, a planetary differential gear set, means for connecting two elements of the gear set to the driving and driven members respectively, means inclosing the gears of the gear set whereby they form a fluid pump and providing inlet and outlets ports for the gear set, a one-way brake holding a third element of the gear set against reverse rotation whereby it can operate as a reduction gear, and control means operable in one position to connect the inlet port to a source of gas and open the outlet port so the gears can rotate freely during operation as a reduction gear, the control means being operable in another position to close the outlet port and connect the inlet port to a source of liquid to lock the gears against relative rotation.

4. In a transmission for connecting a driving member to a driven member, a planetary differential gear set, means for connecting two elements of the gear set to the driving and driven members respectively, means inclosing the gears of the gear set whereby they form a fluid pump and providing inlet and outlet ports for the gear set, a source of liquid under pressure, and control means for the ports operable in one position to close the outlet port and establish communication between the inlet port and said source and in another position to close the inlet port and open the outlet port to substantially atmospheric pressure.

5. In a transmission for connecting a driving shaft to a driven shaft, a planetary differential gear set including a sun gear, a ring gear and planet pinions meshing with the gears, means including plates carrying the planet pinions for inclosing the gears whereby they form a fluid pump, the plates being formed with inlet and outlet ports, means forming an outlet passage radially inward of the outlet ports, and a baffle member carried by one of the plates overlying the outlet ports and extending radially inward toward the outlet passage.

6. In a transmission for connecting a driving shaft to a driven shaft, a planetary differential gear set including a sun gear, a ring gear and planet pinions meshing with the gears, means including plates carrying the planet pinions for inclosing the gears whereby they form a fluid pump, the plates being formed with inlet and outlet ports, cover plates connected to the ring gear inclosing the gear set, the outlet ports discharging into the space within the cover plates, means forming an outlet passage opening into said space radially inward of the outlet ports, and a baffle carried by one of the plates overlying the outlet ports and extending radially inward toward the outlet passage.

7. In a transmission for connecting a driving shaft to a driven shaft, a planetary differential gear set including a sun gear, a ring gear and planet pinions meshing with the gears, means including plates carrying the planet pinions for inclosing the gears whereby they form a fluid pump, the plates being formed with inlet and outlet ports, cover plates connected to the ring gear inclosing the gear set, the outlet ports discharging into the space within the cover plates, means forming inlet and outlet passages adjacent the axis of the gear set communicating respectively with the inlet ports and the space within the cover plates, valve means controlling the passages to open the inlet passages to a source of liquid and close the outlet passage in one position and to open the outlet passage and connect the inlet passage to a source of gas in another position, and an annular baffle connected adjacent its periphery to one of the plates and overlying the outlet ports with its inner edge lying adjacent the outlet passage.

8. In a transmission for connecting a driving member to a driven member, planetary differential gear set, means for connecting two elements of the gear set to the driving and driven members respectively, means inclosing the gears of the gear set whereby they form a fluid pump and providing inlet and outlet ports for the gear set, one of the members including a tubular shaft on which the gear set is mounted, the shaft being formed with inlet and outlet ports communicating respectively with the inlet and outlet ports for the gear set, an elongated valve slidable in the shaft and formed with two separated passages, means forming a source of liquid connected through one of the passages to the inlet port when the valve is in one position, the valve in said one position closing the outlet port, and means communicating with a source of gas and connected to the inlet port through the other passage when the valve is in another position, the valve in said other position opening the outlet port.

9. In a transmission for connecting a driving member to a driven member, a planetary differential gear set, means for connecting two elements of the gear set to the driving and driven members respectively, means inclosing the gears of the gear set whereby they form a fluid pump and providing inlet and outlet ports for the gear set, one of the members including a tubular shaft on which the gear set is mounted, the shaft being formed with inlet and outlet ports communicating respectively with the inlet and outlet ports for the gear set, an elongated tubular valve slidable in the shaft, a central partition in the valve dividing it into two separated passages, means forming a liquid inlet port communicating with one of the passages, and means forming a gas inlet port communicating with the other of the passages, the valve in one position closing the outlet port and opening the inlet port to said one of the passages and in another position opening both the inlet and the outlet port to said other of the passages.

10. In a transmission for connecting a driving member to a driven member, a planetary differential gear set, means for connecting two elements of the gear set to the driving and driven members respectively, means inclosing the gears of the gear set whereby they form a fluid pump and providing inlet and outlet ports for the gear set, one of the members including a tubular shaft on which the gear set is mounted, the shaft being formed with inlet and outlet ports communicating respectively with the inlet and outlet ports for the gear set, an elongated tubular valve slidable in the shaft, a central partition in the valve dividing it into two separated passages, a liquid sump, a pump in the sump having its outlet in communication with one of the passages, and an opening to establish communication between the upper part of the sump and the other of the passages, the valve in one position closing the outlet port and opening the inlet port to said one of the passages and in another position opening both the inlet and outlet ports to said other of the passages.

11. In a transmission for connecting a driving member to a driven member, a planetary differential gear set, means for connecting two elements of the gear set to the driving and driven members respectively, means inclosing the gears of the gear set whereby they form a fluid pump and providing inlet and outlet ports for the gear set, one of the members including a tubular shaft on which the gear set is mounted, the shaft being formed with inlet and outlet ports communicating respectively with the inlet and outlet ports for the gear set, an elongated valve slidable in the shaft formed with a central bore terminating in a transverse bore and with a peripheral reduced portion, the shaft being formed with spaced liquid and gas inlet openings one of which communicates with the central bore, and means for shifting the valve to one position in which the transverse bore communicates with both the inlet port and the other of said openings.

12. In a transmission for connecting a driving member to a driven member, a planetary differential gear set, means for connecting two elements of the gear set to the driving and driven members respectively, means inclosing the gears of the gear set whereby they form a fluid pump and providing inlet and outlet ports for the gear set, one of the members including a tubular shaft on which the gear set is mounted, the shaft being formed with inlet and outlet ports communicating respectively with the inlet and outlet ports for the gear set, an elongated valve slidable in the shaft formed at one end with a pair of separated passages, the shaft being formed adjacent one end with spaced liquid and gas inlet openings adapted to communicate respectively with the passages, and means to shift the valve to one position in which it closes the outlet port and connects the inlet port and the liquid inlet opening through one of the passages and to another position in which it connects the inlet port to the air inlet opening through the other of the passages and opens the outlet port to the other end of the shaft.

13. In a transmission for connecting a driving member to a driven member, a planetary differential gear set, means for connecting two elements of the gear set to the driving and driven members respectively, means inclosing the gears of the gear set whereby they form a fluid pump and providing inlet and outlet ports for the gear set, one of the members including a tubular shaft on which the gear set is mounted, the shaft being formed with inlet and outlet ports communicating respectively with the inlet and outlet ports for the gear set, an elongated valve slidable in the shaft formed at one end with a pair of separated passages, the shaft being formed adjacent one end with spaced liquid and gas inlet openings adapted to communicate respectively with the passages, the other end of the valve being formed with a central bore terminating in a transverse bore spaced from said other end of the valve, means for shifting the valve to two positions in one of which it connects the liquid inlet opening to the inlet port thru one of said passages and closes the outlet port, and in another of which it opens the inlet port to the air inlet opening thru the other of the passages and opens the outlet port to the other end of the shaft, and a pressure responsive valve connecting the outlet port to the transverse bore when the first named valve is in said one position.

14. In a transmission for connecting a driving member to a driven member, a planetary differential gear set having two of its elements connected to the driving and driven members respectively, means inclosing the gears of the gear set and providing inlet and outlet ports therefor, means forming an elongated valve casing having liquid and gas inlet openings adjacent one end and a discharge opening adjacent its other end, a valve in the casing shiftable to one position in which it connects the inlet port and the liquid inlet openings and closes the discharge port and to another position in which it connects the inlet port to the gas inlet opening and connects the discharge port to the discharge opening, and a heat exchange device connected to the discharge opening.

ADIEL Y. DODGE.

Certificate of Correction

Patent No. 2,402,382.

June 18, 1946.

ADIEL Y. DODGE

It is hereby certified that errors appear in the printed specification of the above numbered patent requiring correction as follows: Column 4, line 14, for the words "oil is" read *oil in*; column 7, line 59, claim 1, for "including" read *inclosing*: and that the said Letters Patent should be read with these corrections therein that the same may conform to the record of the case in the Patent Office.

Signed and sealed this 3rd day of December, A. D. 1946

[SEAL]

LESLIE FRAZER,
*First Assistant Commissioner of Patents.* being formed with a central bore terminating in a transverse bore spaced from said other end of the valve, means for shifting the valve to two positions in one of which it connects the liquid inlet opening to the inlet port thru one of said passages and closes the outlet port, and in another of which it opens the inlet port to the air inlet opening thru the other of the passages and opens the outlet port to the other end of the shaft, and a pressure responsive valve connecting the outlet port to the transverse bore when the first named valve is in said one position.

14. In a transmission for connecting a driving member to a driven member, a planetary differential gear set having two of its elements connected to the driving and driven members respectively, means inclosing the gears of the gear set and providing inlet and outlet ports therefor, means forming an elongated valve casing having liquid and gas inlet openings adjacent one end and a discharge opening adjacent its other end, a valve in the casing shiftable to one position in which it connects the inlet port and the liquid inlet openings and closes the discharge port and to another position in which it connects the inlet port to the gas inlet opening and connects the discharge port to the discharge opening, and a heat exchange device connected to the discharge opening.

ADIEL Y. DODGE.

Certificate of Correction

Patent No. 2,402,382. June 18, 1946.

ADIEL Y. DODGE

It is hereby certified that errors appear in the printed specification of the above numbered patent requiring correction as follows: Column 4, line 14, for the words "oil is" read *oil in*; column 7, line 59, claim 1, for "including" read *inclosing*: and that the said Letters Patent should be read with these corrections therein that the same may conform to the record of the case in the Patent Office.

Signed and sealed this 3rd day of December, A. D. 1946

[SEAL]

LESLIE FRAZER,
*First Assistant Commissioner of Patents.*